United States Patent Office 3,275,685
Patented Sept. 27, 1966

3,275,685
[(1-ALKENYLSULFONYL)PHENOXY] ALKANOIC ACIDS
Everett M. Schultz, Ambler, Pa., assignor to Merck & Co., Inc., Rahway, N.J., a corporation of New Jersey
No Drawing. Filed Apr. 29, 1965, Ser. No. 452,020
18 Claims. (Cl. 260—521)

The instant application is a continuation-in-part of my copending patent application Serial No. 298,426, filed July 29, 1963, now abandoned.

This invention relates to a new class of chemical compounds which can be described generally as [(1-alkenylsulfonyl)phenoxy]alkanoic acids and to the nontoxic, pharmacologically acceptable acid addition salt, ester and amide derivatives thereof.

The products of this invention are diuretics and saluretics which can effect an elimination of excess fluid and electrolyte from the body. When administered in therapeutic dosages in conventional vehicles, the instant products effectively lower dangerous excesses of fluid levels to acceptable levels, reduce the concentration of sodium and chloride ions in the body and, in general, ameliorate conditions associated with electrolyte and fluid retention.

The [(1-alkenylsulfonyl)phenoxy]alkanoic acids of the invention are compounds having the following structural formula:

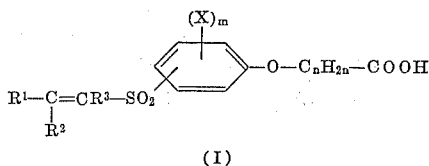

(I)

wherein $R^1$ is a member selected from the group consisting of hydrogen and an hydrocarbyl radical of the formula: $R—CH_2—$ wherein R is a member selected from the group consisting of hydrogen and lower alkyl, for example, methyl, ethyl, etc.; $R^2$ and $R^3$ represent similar or dissimilar substituents selected from the group consisting of hydrogen and lower alkyl, for example, methyl, ethyl, propyl, etc.; the X radicals represent similar or dissimilar substituents selected from the group consisting of hydrogen, halogen, for example, chlorine, fluorine, iodine, etc., alkyl, for example, lower alkyl such as methyl, ethyl, etc., alkoxy, for example, lower alkoxy such as methoxy, ethoxy, etc., and, when substituted on adjacent carbon atoms of the benzene nucleus, two X radicals may be combined to form an hydrocarbylene chain (i.e., a divalent organic radical composed solely of carbon and hydrogen) containing four carbon atoms between their points of attachment, for example, a 1,3-butadienylene chain (i.e., —CH=CH—CH=CH—), etc.; m is an integer having a value of 1–4 and n is an integer having a value of 1–4; and the nontoxic, pharmacologically acceptable acid addition salts of the said products. In general, any base which will form an acid addition salt with the foregoing [(1-alkenylsulfonyl)phenoxy]alkanoic acids (I) and whose pharmacological properties will not cause an adverse physiological effect when ingested by the body system is considered as being within the scope of this invention; suitable bases thus include, for example, the alkali metal and alkaline earth metal hydroxides, carbonates, etc., ammonia, primary, secondary and tertiary amines such as monoalkylamines, dialkylamines, trialkylamines, nitrogen containing heterocyclic amines, for example, piperidine, etc.

A preferred embodiment of the invention relates to the [4-(1-alkenylsulfonyl)phenoxy]alkanoic acids having the following structural formula:

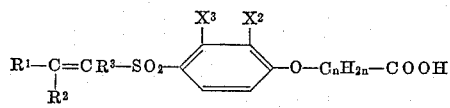

wherein $R^1$ is a member selected from the group consisting of hydrogen and an hydrocarbyl radical of the formula: $R—CH_2—$ wherein R is a member selected from the group consisting of hydrogen and lower alkyl; $R^2$ and $R^3$ represent similar or dissimilar substituents selected from the group consisting of hydrogen and lower alkly; $X^2$ and $X^3$ represent similar or dissimilar members selected from the group consisting of hydrogen, halogen and lower alkyl and n is an integer having a value of 1–4. The above class of compounds exhibits particularly good diuretic and saluretic activity and represents a preferred subgroup of compounds within the scope of this invention.

The choice of a suitable method by which to prepare the compounds of the invention is dependent largely upon the character of the alkenyl group in the [(1-alkenylsulfonyl)phenoxy]alkanoic acid product (I). When, for example, the product is a [(1-alkenylsulfonyl)phenoxy]alkanoic acid which is substituted at the terminal carbon of the vinyl group by one or two alkyl radicals as, for instance, where either or both of the $R^1$ and $R^2$ radicals in planar Formula I, supra, are lower alkyl, it is most advantageous to first effect a rearrangement of the double bond in the corresponding (allylmercaptophenoxy)alkanoic acid precursor or in the ester derivative thereof (II, infra) by treatment with a base and then oxidize the (1-alkenylmercaptophenoxy)alkanoic acid (III, infra) thus formed to the desired sulfone (Ia, infra). The following equation illustrates this method of preparation:

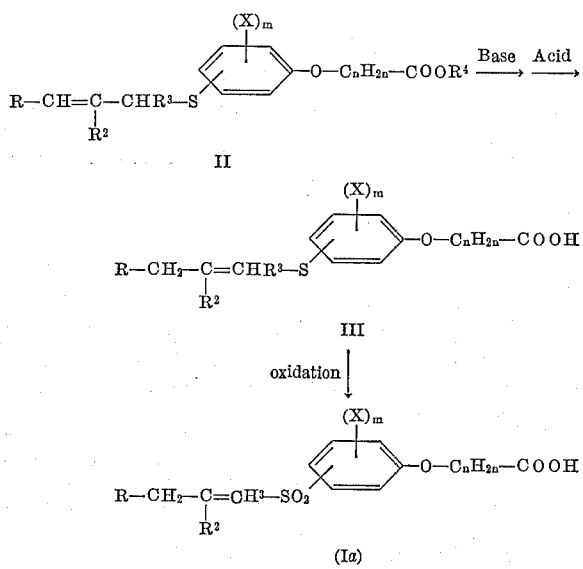

wherein R, $R^2$, $R^3$, X, m and n are as defined above and $R^4$ is hydrogen or an hydrocarbyl radical (i.e., an organic radical composed solely of carbon and hydrogen) such as lower alkyl, for example, methyl, ethyl, etc., aryl, for example, phenyl, etc.

Rearrangement of the (allylmercaptophenoxy)alkanoic acid or its ester derivatives (II) to the corresponding (1-alkenylmercaptophenoxy)alkanoic acid (III) is advantageously effected by treating the said allyl compound with a base such as with an aqueous solution of an alkali metal hydroxide such as sodium hydroxide, etc., followed by acidification of the carboxylate salt thus formed to the desired carboxylic acid (III).

Oxidizing agents which are suitable for converting the (1-alkenylmercaptophenoxy)alkanoic acid (III) to the sulfone product include any oxidizing agent which is capable of oxidizing a mercapto compound to the corresponding sulfone derivative but which does not oxidize the alkenyl group under the same reaction conditions. Oxidizing agents suitable for use in the process thus include, for example, hydrogen peroxide, etc.

Still another method for preparing the [(1-alkenylsulfonyl)phenoxy]alkanoic acids (I) of the invention consists in oxidizing the hydrocarbyl ester of an [(haloalkylmercapto)phenoxy]alkanoic acid (IV, infra) to the corresponding sulfone derivative (V, infra) and then treating the sulfone intermediate thus obtained with a dehydrohalogenating agent. Like the foregoing method of preparation, the instant process may be used to prepare those products of the invention which are substituted at the terminal carbon of the vinyl group by an alkyl radical but, more particularly, the instant process is the preferred route by which to obtain those products having an alkyl group at the carbon atom of the vinyl moiety which is adjacent to the sulfone group, i.e., those products corresponding to general Formula I, supra, wherein the radical $R^3$ represents lower alkyl. The following equation illustrates this method of preparation:

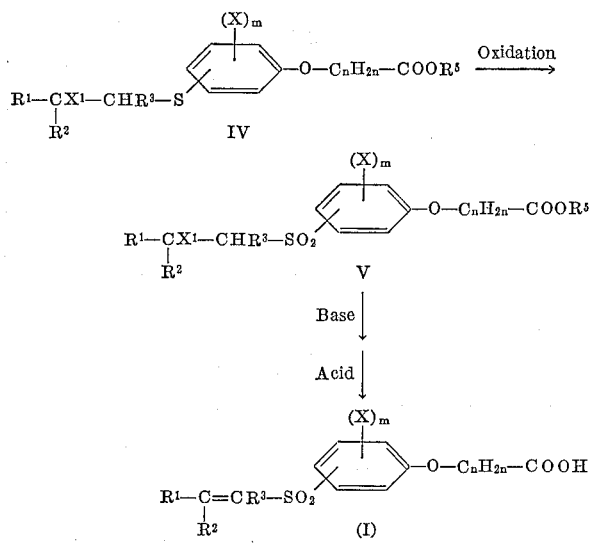

wherein $R^1$, $R^2$, $R^3$, X, $m$ and $n$ are defined above; $R^5$ is an hydrocarbyl radical, for example, a lower alkyl radical such as methyl, ethyl, etc., and $X^1$ is halogen, for example, chlorine, bromine, etc.

Oxidation of the [(2-haloalkylmercapto)phenoxy]alkanoic acid ester (IV) to the corresponding sulfone analog (V) is effected by employing any of the oxidizing agents described above for conversion of the [(allylmercapto)phenoxy]alkanoic acid or [(allylmercapto)phenoxy]alkanoic acid ester (II) to its sulfone derivative. For example, hydrogen peroxide in acetic acid has proved to be a suitable reagent but it will be apparent to those having ordinary skill in the art that other oxidizing agents and other solvents may also be used in an analogous manner to obtain the sulfone derivative (V). Generally, the oxidation reaction is favored by the application of heat and, therefore, it is preferable to conduct the oxidation step at raised temperatures as for example, at temperatures in the range of 80–90° C. for extended periods.

Dehydrohalogenation of the sulfone compound (V) to the desired product is carried out in a conventional manner by the treatment thereof with a suitable basic reagent as, for example, by treatment with an aqueous solution of sodium hydroxide, followed by the conversion of the [(1-alkenylsulfonyl)phenoxy]carboxylate salt thus formed to the corresponding [(1-alkenylsulfonyl)phenoxy]alkanoic acid product (I) by treatment with an acid.

The [(allylmercapto)phenoxy]alkanoic acids and the esterified derivatives thereof (II) and the [(2-haloalkylmercapto)phenoxy]alkanoic acid esters (V) which are employed as starting materials in the two foregoing preparative methods are prepared by various routes. The [(allylmercapto)phenoxy]alkanoic acids and the corresponding ester derivatives thereof (II) for example, are synthesized from the appropriate ester of a (mercaptophenoxy)alkanoic acid (VI, infra) by the reaction thereof with a suitable allyl halide in the presence of a base as described below:

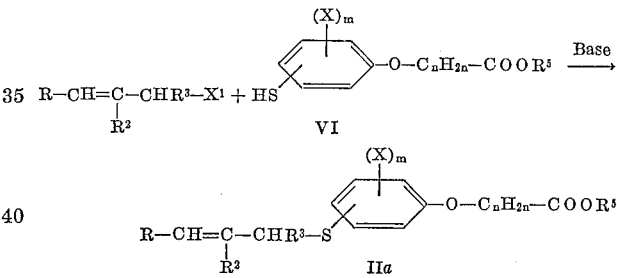

wherein R, $R^2$, $R^3$, $R^5$, X, $X^1$, $m$ and $n$ are as defined above. The esterified derivative (IIa) thus obtained may then be used directly as a starting material or, if desired, may be hydrolyzed to the corresponding [(allylmercapto)phenoxy]alkanoic acid by the treatment thereof with an aqueous solution of a base as, for example, with an aqueous solution of sodium hydroxide.

The [(2 - haloalkylmercapto)phenoxy]alkanoic acid ester derivatives (IV) are also obtained from the (mercaptophenoxy)alkanoic acid ester compounds (VI) but, in lieu of treating the latter with the allyl halides employed in the preceding preparative method, the said (mercaptophenoxy)alkanoic acid esters are treated with an halohydrin and the [(1-hydroxymethylalkylmercapto)phenoxy]alkanoic acid ester (IX) thus formed is subsequently halogenated to yield the desired halo derivative (IV). Alternatively, in lieu of employing the halohydrin reactant per se, it is also possible to react the (mercaptophenoxy)alkanoic acid ester (VI) with an alkanoic acid ester derivative of an halohydrin and then hydrolyze the [(1-carboxymethylalkylmercapto)phenoxy]alkanoic acid ester derivative (VII) thus obtained by treatment with a base and then with an acid to convert the said intermediate to the corresponding [(1-hydroxymethylalkylmercapto)phenoxy]alkanoic acid (VIII); esterifying the said alkanoic acid by conventional means and then halogenating the resulting ester (IX) to the desired [(2-haloalkylmercapto)phenoxy]alkanoic acid ester (IV). The following equations illustrate these processes:

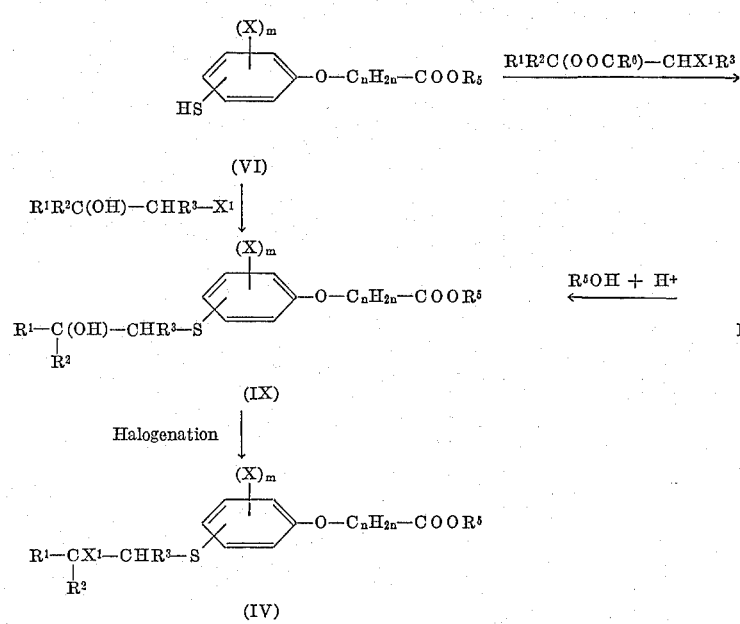
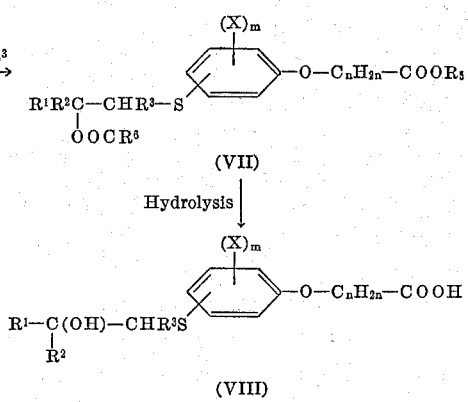

wherein $R^1$, $R^2$, $R^3$, $R^5$, $X$, $X^1$, $m$ and $n$ are defined as above; $R^6$ is lower alkyl, for example, methyl, ethyl, etc. and $H^-$ is the cation derived from an organic or inorganic acid such as hydrochloric acid, etc. Halogenating agents which may be employed in the foregoing process include, for example, thionyl chloride, etc.

The alkanoic acid ester of the halohydrin which is reacted with the (mercaptophenoxy)alkanoic acid ester (VI) in the foregoing process is conveniently prepared by treating an appropriate halohydrin, such as 2-bromobutanol, with an alkanoic acid or alkanoic acid anhydride or with a mixture of an alkanoic acid and its anhydride.

The (mercaptophenoxy)alkanoic acid ester (VI), which is employed as the starting material in the foregoing reaction with an halohydrin or with an ester of an halohydrin, is conveniently prepared from nitrophenol or from an appropriately substituted nitrophenol by known methods. Thus, for example, a nitrophenol, which may be obtained from the corresponding phenol by the treatment thereof with nitric acid in chloroform, is allowed to react with an ester of an haloalkanoic acid in the presence of a base such as sodium ethoxide and the (nitrophenoxy)alkanoic acid ester thus formed is treated with a reducing agent as, for example, with hydrogen in the presence of a ruthenium on carbon catalyst, to convert the said nitro derivative to the corresponding (aminophenoxy)alkanoic acid ester and the said amine derivative is then diazotized and the diazo intermediate treated successively with potassium thioxanthate and then with a base such as potassium hydroxide, to obtain a (mercaptophenoxy)alkanoic acid, which is esterified by reaction with an alcohol as, for example, by reaction with methanol in the presence of sulfuric acid. When the process is conducted under atmospheric conditions the (mercaptophenoxy)alkanoic acid ester (VI) thus obtained, usually contains significant amounts of the corresponding disulfide analog because of atmospheric oxidation; therefore, it is most advantageous to treat the crude mixture of mercaptan and disulfide thus formed with zinc dust in acetic acid so as to reduce the disulfide component to the desired (mercaptophenoxy)alkanoic acid ester.

Also included within the scope of this invention are the ester and amide derivatives of the instant products which are prepared by conventional methods well-known to those skilled in the art. Thus, for example, the ester derivatives may be prepared by the reaction of a [(1-alkenylsulfonyl)phenoxy]alkanoic acid of this invention with an alcohol as, for example, with a lower alkyl alcohol or, alternatively, the [(1-alkenylsulfonyl)phenoxy] alkanoic acid may be converted to its acid halide by conventional methods and the acid halide treated with an appropriate lower alkyl alcohol. The amide derivatives of the [(1-alkenylsulfonyl)phenoxy]alkanoic acids of the invention may be prepared by treating the acid halide of the said products with ammonia or an appropriate mono- or dialkylamine to produce the corresponding amide. Still another process for preparing the said amide derivatives comprises the conversion of an ester of [(1-alkenylsulfonyl)phenoxy]alkanoic acid to its corresponding amide by treating the said ester with ammonia or an appropriate monoalkylamine or dialkylamine to produce the corresponding amide compound. These and other equivalent methods for the preparation of the ester and amide derivatives of the instant products will be apparent to one having ordinary skill in the art and to the extent that the said derivatives are both nontoxic and physiologically acceptable to the body system, the said derivatives and amides are the functional equivalent of the corresponding [(1 - alkenylsulfonyl)phenoxy]alkanoic acids.

The examples which follow illustrate the [(1-alkenylsulfonyl)phenoxy]alkanoic acid products of the invention and the methods by which they may be prepared. However, the examples are illustrative only and it will be apparent to one having ordinary skill in the art that all of the products embraced by Formula I, supra, may be prepared in an analogous manner by substituting the appropriate starting materials for those set forth in the examples.

EXAMPLE 1

*(3-chloro-4-vinylsulfonylphenoxy)acetic acid*

STEP A: ETHYL (3-CHLORO-4-NITRO-PHENOXY)ACETATE

Sodium (20.4 g., 0.887 mole) is dissolved in absolute ethanol (750 ml.). To this solution is added 3-chloro-4-nitrophenol (154 g., 0.887 mole) dissolved in absolute ethanol (200 ml.). The solution is heated to boiling and ethyl bromoacetate (148 g., 0.887 mole) is added. The mixture then is heated for 16 hours, the alcohol distilled and water is added to the residue. The mixture is extracted with ether and the ether extract dried and evaporated. The residue is crystallized from ethanol to give 140 g. of ethyl (3-chloro-4-nitrophenoxy)acetate, M.P. 59–60° C.

Analysis for $C_{10}H_{10}ClNO_5$: Calculated: C, 46.25; H, 3.88. Found: C, 46.60; H, 3.92.

STEP B: ETHYL (3-CHLORO-4-AMINO PHENOXY)ACETATE

To a slurry of 10% ruthenium on carbon (1.5 g.) in ethanol, there is added a slurry of ethyl (3-chloro-4-nitrophenyl)acetate (51.94 g., 0.02 mole) in ethanol (250 ml.). The mixture is hydrogenated in a Parr apparatus, the calculated amount of hydrogen being absorbed in 23 hours. Removal of the catalyst and solvent leaves ethyl (3-chloro-4-aminophenoxy)acetate (43 g.) which melts at approximately 67° C. This product is used in the next step without further purification.

STEP C: METHYL (3-CHLORO-4-MERCAPTOPHENOXY)ACETATE

Ethyl (3-chloro-4-aminophenoxy)acetate (78.5 g.) is added portionwise to a mixture of 65 ml. of concentrated hydrochloric acid and 290 ml. of water at 5° C. and a solution of sodium nitrite (25.6 g.) in water (58 ml.) is added dropwise at 5° C. The mixture is stirred for 0.5 hour and filtered. The solution is added dropwise at 45–50° C. to a stirred solution of 76 g. potassium ethyl xanthate in 83 ml. of water. The mixture then is heated for one additional hour, cooled and extracted with ether. The dried ether solution is evaporated, the residue dissolved in ethanol (300 ml.) and the solution heated to boiling. The heat is removed and potassium hydroxide pellets (89.0 g.) are added at such a rate as to maintain boiling. The mixture then is refluxed for one hour. Upon cooling, a solid separates which is collected by filtration and then washed with alcohol and ether. The potassium salt thus obtained is dissolved in water. Upon acidification, solid (3-chloro-4-mercaptophenoxy)acetic acid separates, M.P. 135–140° C.

The crude dry (3-chloro-4-mercaptophenoxy)acetic acid (104.5 g.) is dissolved in methanol (500 ml.) and concentrated sulfuric acid (16 ml.) is added. The mixture is refluxed for 16 hours and the methanol evaporated at reduced pressure. The residue is dissolved in ether and the ether extract washed with water and evaporated. The resulting mixture, which consists of mercapto and disulfide compounds, is dissolved in glacial acetic acid (500 ml.) and zinc dust (90 g.) is added. The mixture is heated at 80–90° C. for 16 hours and sufficient concentrated hydrochloric acid then is added to dissolve the precipitate of zinc acetate. The mixture is heated at 80–90° C., cooled and diluted with water (one liter). A solid separates which is dissolved in ether. The ether solution is washed with water and dried. Evaporation of the ether yields 87 g. of methyl (3-chloro-4-mercaptophenoxy)acetate, M.P. 53–54° C. For analysis, a sample of methyl (3-chloro-4-mercaptophenoxy)acetate crystallized from methanol, yields a purified product melting at 54.5–55° C.

Analysis for $C_9H_9ClO_3S$: Calculated: C, 46.45; H, 3.90; Cl, 15.24; S, 13.78. Found: C, 46.94; H, 4.07; Cl, 14.98; S, 13.59.

STEP D: METHYL [3-CHLORO-4-(2-HYDROXYETHYL) MERCAPTOPHENOXY]ACETATE

Methyl (3-chloro-4-mercaptophenoxy)acetate (9.28 g., 0.04 mole) in methanol (50 ml.) is added to a solution of sodium (1.10 g., 0.044 mole) in methanol (150 ml.). The mixture is heated to boiling and 2-bromoethanol (5.55 g., 0.044 mole) added with stirring. Stirring and heating are continued for 2.75 hours. The alcohol then is distilled. Water is added to dissolve the inorganic salts and the mixture then is extracted with ether. The ether extract is dried over sodium sulfate and the ether removed by evaporation. The residue is dried further by aerotropic distillation with benzene. After removal of all of the benzene, the residue, methyl [3-chloro-4-(2-hydroxyethyl)mercaptophenoxy]acetate, is used in the next step since distillation of the oily product causes polymerization.

STEP E: METHYL [3-CHLORO-4-(2-CHLOROETHYLMERCAPTO)PHENOXY]ACETATE

The oily residue of methyl [3-chloro-4-(2-hydroxyethyl)mercaptophenoxy]acetate from Step D is dissolved in fresh benzene (50 ml.) and thionyl chloride (9.52 g., 0.08 mole) added thereto. After the initial reaction subsides, the mixture is heated for 2.5 hours. The benzene and excess thionyl chloride are evaporated under reduced pressure at 80–90° C. Two additional portions of benzene (50 ml.) are added and evaporated to remove the thionyl chloride completely. The oily residue, which is identified as methyl [3-chloro-4-(2-chloroethylmercapto)phenoxy]acetate, is used directly in the next step.

STEP F: METHYL [3-CHLORO-4-(2-CHLOROETHYLSULFONYL)PHENOXY]ACETATE

The methyl [3-chloro-4-(2-chloroethylmercapto)phenoxy]acetate from Step E is dissolved in acetic acid and 30% hydrogen peroxide (11.4 g., 0.1 mole) is added portionwise with stirring at 5–10° C. The mixture then is allowed to warm to 25–30° C. and is kept at this temperature for 16 hours and then heated at 80–90° C. for 1.25 hours. Ten ml. of acetic acid and 11.4 g. of hydrogen peroxide are added and the mixture then is heated for an additional two hours. The mixture is added to water (500 ml.) and the milky suspension that forms gradually solidifies. The solid is collected by filtration, washed with water and air dried at 25–30° C. The dried product is digested with hot benzene in three 50 ml. portions to give 5.8 g. of methyl [3-chloro-4-(2-chloroethylsulfonyl)phenoxy]acetate that melts at about 165° C.

STEP G: (3-CHLORO-4-VINYLSULFONYLPHENOXY)ACETIC ACID

Methyl [3-chloro-4-(2-chloroethylsulfonyl)phenoxy]acetate (1.0 g.) is suspended in water (10 ml.) and 10% sodium hydroxide is added dropwise at such a rate that the originally basic reaction mixture becomes neutral after each addition. When the mixture remains basic in this process, it is acidified with hydrochloric acid. The solid that forms is separated and dried at 65° C. in air. Upon crystallization from isopropyl alcohol there is obtained 0.27 g. of (3-chloro-4-vinylsulfonylphenoxy)acetic acid, M.P. 177–178° C.

Analysis for $C_{10}H_9ClO_5S$: Calculated: C, 43.42; H, 3.28; Cl, 12.82; S, 11.59. Found: C, 43.25; H, 3.42; Cl, 12.66; S, 11.25.

EXAMPLE 2

*(3-chloro-4-vinylsulfonylphenoxy)acetpiperidide*

(3-chloro-4-vinylsulfonylphenoxy)acetic acid (5.52 g., 0.02 mole) is added to 0.6 N methanolic hydrogen chloride (100 ml.). The mixture is kept at 25° C. for 16 hours and then the methanol and hydrogen chloride are removed at 25° C. under reduced pressure. The residue is taken up in dry benzene (50 ml.) and piperidine (2.55 g., 0.03 mole) is added. The mixture is kept at 25–30° C. for 48 hours. The precipitate of (3-chloro-4-vinylsulfonylphenoxy)acetpiperidide then is collected by filtration and crystallized from isopropyl alcohol.

EXAMPLE 3

Sodium *(3-chloro-4-vinylsulfonylphenoxy)acetate*

(3-chloro-4-vinylsulfonylphenoxy)acetic acid (2.76 g., 0.01 mole) is suspended in water (100 ml.) and 1 N sodium hydroxide is added until the solution formed is just basic. The solution is neutralized by adding additional (3-chloro-4-vinylsulfonylphenoxy)acetic acid, then filtered to remove the excess solid acid and the solution evaporated to dryness at 30° C. under reduced pressure to yield sodium (3-chloro-4-vinylsulfonylphenoxy)acetate.

EXAMPLE 4

Methyl *(3-chloro-4-vinylsulfonylphenoxy)acetate*

(3-chloro-4-vinylsulfonylphenoxy)acetic acid (7.28 g., 0.03 mole) is dissolved in 6 N methanolic hydrogen chloride (100 ml.). The mixture is kept at 25–30° C.

for 16 hours. The hydrogen chloride and excess methanol are removed by distillation at 25° C. under reduced pressure to yield methyl (3-chloro-4-vinylsulfonylphenoxy)acetate.

EXAMPLE 5

(4-vinylsulfonylphenoxy)acetic acid

STEP A: METHYL (4-MERCAPTOPHENOXY)ACETATE

When ethyl (4-aminophenoxy)acetate is substituted for the ethyl (3-chloro-4-aminophenoxy)acetate of Example 1, Step C, and the procedure described therein is followed, the compound methyl (4-mercaptophenoxy)acetate in the form of a white solid is obtained, M.P. 107–108° C.

Analysis for $C_9H_{10}O_3S$: Calculated: C, 54.53; H, 5.08; S, 16.17. Found: C, 54.77; H, 4.98; S, 16.16.

STEP B: METHYL [4-(2-HYDROXYETHYLMERCAPTO) PHENOXY]ACETATE AND [4-(2-HYDROXYETHYLMERCAPTO)PHENOXY]ACETIC ACID

When an equimolar amount of methyl (4-mercaptophenoxy)acetate is substituted for the methyl (3-chloro-4-mercaptophenoxy)acetate of Example 1, Step D, and the procedure described therein is followed, the product methyl [4-(2-hydroxyethylmercapto)phenoxy]acetate is obtained as an oil, B.P. 176–178° C. at 0.5 mm. pressure. Upon hydrolyzing a portion of the ester in methanolic potassium hydroxide [4-(2-hydroxyethylmercapto)phenoxy]-acetic acid is obtained which, after crystallization from water or ethyl acetate, melts at 109–112° C.

Analysis for $C_{10}H_{12}O_4S$: Calculated: C, 52.61; H, 5.30; S, 14.04. Found: C, 53.00; H, 5.37; S, 14.26.

STEP C: METHYL [4-(2-CHLOROETHYLMERCAPTO)PHENOXY]ACETATE

Methyl [4-(2-hydroxyethylmercapto)phenoxy]acetate (22.6 g., 0.093 mole) is added gradually to thionyl chloride (44 g., 0.372 mole). The mixture is heated for 1.5 hours and the excess thionyl chloride removed by distillation at reduced pressure. The residue is distilled to give 19.3 g. (83%) of methyl [4-(2-chloroethylmercapto)phenoxy]acetate, B.P. 150–155° C. at 0.5 mm. pressure.

STEP D: METHYL [4-(2-CHLOROETHYLSULFONYL)PHENOXY]ACETATE

The methyl [4-(2-chloroethylmercapto)phenoxy]acetate obtained in Step C (11.7 g., 0.045 mole) is dissolved in acetic acid (45 ml.) and 30% hydrogen peroxide (31 g.) is added slowly at 10° C. The mixture is kept at 25–30° C. for one hour and then heated at 80–90° C. for 2.5 hours, cooled and poured into water (300–400 ml.). The solid methyl [4-(2-chloroethylsulfonyl)phenoxy]-acetate that separates is washed with water and dried over phosphorus pentoxide at reduced pressure.

STEP E: (4-VINYLSULFONYLPHENOXY)ACETIC ACID

Methyl [4-(2-chloroethylsulfonyl)phenoxy]acetate (0.5 g., 0.0017 mole) is dissolved in tetrahydrofuran (10 ml.) and triethylamine (0.25 g., 0.0027 mole) is added. The mixture is kept at 25–30° C. for 20 hours and the triethylamine hydrochloride that precipitates is removed by filtration. The tetrahydrofuran is evaporated at 80–90° C. and water is added to the oily residue, which soon solidifies. Sodium hydroxide solution (2.5%) is added dropwise with shaking to the mixture, being careful to keep the mixture just basic. All but a few flakes of the solid dissolve. The mixture is filtered and acidified with hydrochloric acid whereupon an oil soon separates and solidifies. The solid is collected, dried at 65° C. and crystallized from a mixture of benzene and ethyl acetate to yield 0.150 g. of (4-vinylsulfonylphenoxy)acetic acid, M.P. 153.5–154.5° C.

Analysis for $C_{10}H_{10}O_5S$: Calculated: C, 49.59; H, 4.16; S, 13.23. Found: C, 50.18; H, 4.39; S, 12.87.

EXAMPLE 6

(3-bromo-4-vinylsulfonylphenoxy)acetic acid

By replacing the 3-chloro-4-nitrophenol employed in Example 1, Step A, by an equimolecular quantity of 3-bromo-4-aminophenol and following substantially the same procedure described therein there is obtained ethyl (3-bromo-4-aminophenoxy)acetate. The ester product thus obtained is then substituted for the ethyl (3-chloro-4-aminophenoxy)acetate of Example 1, Step C, and treated according to the process described therein to yield methyl (3-bromo-4-mercaptophenoxy)acetate. Reaction of the methyl (3-bromo-4-mercaptophenoxy)acetate with 2-bromoethanol in the presence of sodium methoxide by the method described in Example 1, Step D, results in the formation of methyl [3-bromo-4-(2-hydroxyethylmercapto)-phenoxy]acetate. The 2-hydroxy group of this compound is replaced by chloro by the reaction thereof with thionyl chloride, as described in Example 1, Step E, and then the mercapto group of the methyl [3-bromo-4-(2-chloroethylmercapto)phenoxy]acetate thus obtained is oxidized to the sulfone by treatment with hydrogen peroxide as described in Example 1, Step F. The thus obtained methyl [3-bromo-4-(2-chloroethylsulfonyl)phenoxy]-acetate then is dehydrohalogenated and hydrolyzed according to the method described in Example 1, Step G, to yield (3-bromo-4-vinylsulfonylphenoxy)acetic acid.

EXAMPLE 7

(3-methyl-4-vinylsulfonylphenoxy)acetic acid

By replacing the 3-chloro-4-nitrophenol of Example 1, Step A, with an equimolecular quantity of 3-methyl-4-aminophenol and following substantially the procedure described therein there is obtained ethyl (3-methyl-4-aminophenoxy)acetate. This product then is used in lieu of the ethyl (3-chloro-4-aminophenoxy)acetate employed in Example 1, Step C, and treated according to the same method there described to give methyl (3-methyl-4-mercaptophenoxy)acetate. The methyl ester thus obtained then is reacted with 2-bromoethanol in the presence of sodium methoxide by the method described in Example 1, Step D, to obtain methyl [3-methyl-4-(2-hydroxyethylmercapto)phenoxy]acetate. The hydroxy group of this compound is then replaced by chloro through reaction with thionyl chloride as described in Example 1, Step E, and then the sulfur group of the methyl [3-methyl-4-(2-chloroethylmercapto)phenoxy]acetate thus obtained is oxidized to the sulfone by treatment with hydrogen peroxide according to the method described in Example 1, Step F. The thus obtained methyl [3-methyl-4-(2-chloroethylsulfonyl)phenoxy]acetate then is dehydrohalogenated and hydrolyzed by the procedure described in Example 1, Step G, to give (3-methyl-4-vinylsulfonylphenoxy)acetic acid.

EXAMPLE 8

(2,3-dimethyl-4-vinylsulfonylphenoxy)acetic acid

By replacing the 3-chloro-4-nitrophenol of Example 1, Step A, with an equimolecular quantity of 2,3-dimethyl-4-aminophenol and following substantially the procedure described therein there is obtained ethyl (2,3-dimethyl-4-aminophenoxy)acetate. This product then is used in lieu of the ethyl (3-chloro-4-aminophenoxy)acetate employed in Example 1, Step C, and treated according to the same method there described to give methyl (2,3-dimethyl-4-mercaptophenoxy)acetate. Reaction of the methyl (2,3-dimethyl-4-mercaptophenoxy)acetate with 2-bromoethanol in the presence of sodium methoxide by the method described in Example 1, Step D, yields methyl [2,3-dimethyl - 4(2 - hydroxyethylmercapto)phenoxy]acetate. The hydroxy group of this compound is replaced by chloro through reaction with thionyl chloride as described in Example 1, Step E, and then the mercapto group of the methyl [2,3-dimethyl-4-(chloroethylmercapto)phenoxy]-acetate thus obtained is oxidized to the sulfone by treatment with hydrogen peroxide according to the method described in Example 1, Step F. The thus obtained methyl [2,3-dimethyl-4-(2-chloroethylsulfonyl)phenoxy]acetate then is dehydrohalogenated and hydrolyzed by the procedure described in Example 1, Step G, to yield (2,3-dimethyl-4-vinylsulfonylphenoxy)acetic acid.

EXAMPLE 9

*(2,3-dichloro-4-vinylsulfonylphenoxy)acetic acid*

By replacing the 3-chloro-4-nitrophenol employed in Example 1, Step A, by an equimolecular quantity of 2,3-dichloro-4-aminophenol and following substantially the procedure described therein there is obtained ethyl (2,3-dichloro-4-aminophenoxy)acetate. This product then is used in lieu of the ethyl (3-chloro-4-aminophenoxy)acetate recited in Example 1, Step C, and treated according to the method described therein to yield methyl (2,3-dichloro-4-mercaptophenoxy)acetate. When this product is reacted with 2-bromoethanol in the presence of sodium methoxide by the method described in Example 1, Step D, methyl [2,3 - dichloro - 4-(2-hydroxyethylmercapto)phenoxy]acetate is obtained. The hydroxy group of this compound is replaced by chloro through reaction with thionyl chloride as described in Example 1, Step E, and then the mercapto group of the methyl [2,3-dichloro-4-(2-chloroethylmercapto)phenoxy]acetate thus obtained is oxidized to the sulfone by treatment with hydrogen peroxide according to the method described in Example 1, Step F. The thus obtained methyl [2,3-dichloro-4-(2-chloroethylsulfonyl)phenoxy]acetate then is dehydrohalogenated and hydrolyzed by the procedure described in Example 1, Step G, to yield (2,3-dichloro-4-vinyl-sulfonylphenoxy)acetic acid.

EXAMPLE 10

*(3-chloro-4-propenylsulfonylphenoxy)acetic acid*

STEP A: METHYL (3-CHLORO-4-ALLYLMERCAPTOPHENOXY)ACTATE

Sodium (0.575 g., 0.0216 mole) is dissolved in 80 ml. of methanol and methyl (3-chloro-4-mercaptophenoxy)-acetate (5.0 g., 0.0216 mole) is added. The mixture is heated to boiling, allyl bromide (3.1 g., 0.025 mole) is added and the mixture then is heated for three hours. The methanol then is distilled and the residue is dissolved in ether. The ether extract is washed with water and dried over sodium sulfate. After evaporation of the ether, the residue is distilled to obtain 3.95 g. of methyl (3-chloro-4-allylmercaptophenoxy)acetate, B.P. 130–135° C. at 0.05 mm.

Analysis for $C_{12}H_{13}ClO_3S$: Calculated: C, 52.84; H, 4.80; Cl, 13.00. Found: C, 52.79; H, 5.00; Cl, 13.00.

STEP B: (3-CHLORO-4-ALLYLMERCAPTOPHENOXY)ACETIC ACID

A sample of methyl (3-chloro-4-allylmercaptophenoxy)acetate (0.3 g.) is added to a solution of 5% sodium hydroxide. The mixture is stirred at 20° C. for 16 hours and acidified with dilute hydrochloric acid. The 280 mg. of (3-chloro-4-allylmercaptophenoxy)acetic acid which separates has a melting point of 104–105° C.

Analysis for $C_{11}H_{11}ClO_3S$: Calculated: C, 51.06; H, 4.29. Found: C, 51.17; H, 4.16.

STEP C: (3-CHLORO-4-PROPENYLMERCAPTOPHENOXY)ACETIC ACID (3-chloro-4-allylmercaptophenoxy)acetic acid (8.0 g.) is added to a solution of sodium (3.5 g.) in ethanol (100 ml.) and the mixture is refluxed under nitrogen for 21 hours, cooled, diluted with ice water and extracted with four 100 ml. portions of ether. The aqueous-alcoholic mixture then is concentrated to about 300 ml. under reduced pressure. The concentrate is acidified with hydrochloric acid and the solid that separates is crystallized from cyclohexane to obtain 1.2 g. of pure (3-chloro-4-propenylmercaptophenoxy)acetic acid, M.P. 135–136° C.

Analysis for $C_{11}H_{11}ClO_3S$: Calculated: C, 51.06; H, 4.29; Cl, 13.70. Found: C, 51.27; H. 4.27; Cl, 13.86.

STEP D: (3-CHLORO-4-PROPENYLSULFONYLPHENOXY)ACETIC ACID (3-chloro-4-propenylmercaptophenoxy)acetic acid (0.2 g.) is dissolved in acetic acid (5 ml.) and 30% hydrogen peroxide (0.5 ml.) is added. The mixture is warmed at 80–90° C. for one hour and then evaporated to dryness at 80–90° C. under reduced pressure. The residue is dissolved in ethyl acetate and filtered. The solution is then concentrated to a small volume to obtain 70 mg. of (3-chloro-4-propenylsulfonylphenoxy)acetic acid, which separates as a solid, M.P. 122–125° C.

Analysis for $C_{11}H_{11}ClO_5S$: Calculated: C, 45.44; H, 3.82; Cl, 12.20. Found: C, 45.22; H, 4.16; Cl, 11.77.

EXAMPLE 11

*[3-chloro-4-(1-butenylsulfonyl)phenoxy]acetic acid*

STEP A: METHYL [3-CHLORO-4-(2-CHLOROBUTYLMERCAPTO)-PHENOXY]ACETATE

Methyl (3-chloro-4-mercaptophenoxy)acetate (13.4 g., 0.057 mole) is added to a solution of sodium (1.4 g., 0.06 mole) in methanol (100 ml.). The mixture is heated to boiling and 2-bromobutanol (9.2 g., 0.06 mole) is added dropwise with stirring during a three hour period, then cooled and neutralized with dilute hydrochloric acid. The methanol is evaporated under reduced pressure and the residue is diluted with water and extracted with ether. The ether extract is dried over magnesium sulfate and evaporated under reduced pressure. The residual oil (11.6 g.) is dissolved in benzene (50 ml.) and thionyl chloride (8.0 g.) is added. The mixture is refluxed for 3.5 hours and then the benzene and excess thionyl chloride are evaporated at reduced pressure. The residue is used directly in the next step.

While 2-bromobutanol might be expected to yield methyl [3 - chloro - 4 - (1 - hydroxymethylpropylmercapto)phenoxy]acetate upon reaction with methyl (3-chloro-4-mercaptophenoxy)acetate, the product of this reaction is actually methyl [3-chloro-4-(2-chlorobutylmercapto)-phenoxy]acetate, which is used directly in the next step.

STEP B: [3-CHLORO-4-(1-BUTENYLSULFONYL) PHENOXY]ACETIC ACID

The methyl [3-chloro-4-(2-chlorobutylmercapto)phenoxy]acetate of Step A (3.0 g.) is dissolved in acetic acid (15 ml.); 30% hydrogen peroxide (9.0 ml.) is added and the mixture is heated at 80–90° C. for 16 hours. Then hydrogen peroxide (15 ml.) is added and heating continued for 16 additional hours. The mixture then is evaporated to dryness at reduced pressure, water is added and 40% sodium hydroxide is added dropwise with shaking until the oily product dissolves and the mixture remains slightly basic. The mixture then is acidified, whereupon an oil separates and slowly solidifies. The solid is crystallized from n-butyl chloride to obtain [3-chloro-4-(1-butenylsulfonyl)phenoxy]acetic acid, M.P. 125–126.5° C. Nuclear Magnetic Resonance examination verified the structure of the product.

Analysis for $C_{12}H_{13}ClO_5S$: Calculated: C, 47.31; H, 4.30; Cl, 11.65. Found: C, 47.60; H, 4.47; Cl, 11.61.

EXAMPLE 12

*[3-chloro-4-(2-methylpropenylsulfonyl)phenoxy]acetic acid*

STEP A: METHYL (3-CHLORO-4-METHALLYLMERCAPTOPHENOXY)ACETATE

Methyl (3-chloro-4-mercaptophenoxy)acetate (11.0 g., 0.0475 mole) is added to a solution of sodium (1.15 g., 0.05 mole) in methanol (100 ml.). Methallyl chloride (4.55 g., 0.05 mole) is added and the mixture is refluxed for three hours. The methanol is evaporated at reduced pressure and the residue dissolved in ether. The ether extract is washed with water, dried and evaporated. The red oil that remains is distilled to obtain 6.6 g. of methyl (3 - chloro - 4 - methallylmercaptophenoxy)acetate, B.P. 157–160° C. at 0.5 mm.

Analysis for $C_{13}H_{16}ClO_3S$: Calculated: C, 54.26; H, 5.60; Cl, 12.32. Found: C, 54.59; H, 5.09; Cl, 12.46.

STEP B: [3-CHLORO-4-(2-METHYLPROPENYLMERCAPTO)PHENOXY]ACETIC ACID

Methyl (3-chloro-4-methallylmercaptophenoxy)acetate (1.2 g.) is added to 40 ml. of 5% sodium hydroxide.

The mixture then is refluxed for 19 hours, cooled and acidified. The solid [3-chloro-4-(2-methylpropenyl-mercapto)phenoxy]acetic acid that separates melts at 133–135° C. Upon recrystallization from methylcyclohexane the melting point of the [3-chloro-4-(2-methylpropenylmercapto)phenoxy]acetic acid is unchanged.

Analysis for $C_{12}H_{13}ClO_3S$: Calculated: C, 52.84; H, 4.80; Cl, 13.00. Found: C, 53.04; H, 4.68; Cl, 13.03.

STEP C: [3-CHLORO-4-(2-METHYLPROPENYLSULFONYL)PHENOXY]ACETIC ACID

[3 - chloro - 4 -(2 - methylpropenylmercapto)phenoxy]acetic acid (1.0 g.) is dissolved in acetic acid (10 ml.) and 30% hydrogen peroxide (3 ml.) is added. The mixture is kept at 20° C. for two days. Upon addition of water, a white solid having a melting point of 158–159.5° C. separates which, after crystallization from a mixture of benzene and acetonitrile, yields pure [3-chloro-4-(2-methylpropenylsulfonyl)phenoxy]acetic acid, M.P. 163.5–164.5° C.

Analysis for $C_{12}H_{13}ClO_5S$: Calculated: C, 47.31; H, 4.30; Cl, 11.65. Found: C, 47.64; H, 4.41; Cl, 11.62.

EXAMPLE 13

*[3-chloro-4-(1-methylenepropylsulfonyl)phenoxy] acetic acid*

STEP A: 2-BROMOBUTYL ACETATE

A mixture of 2-bromobutanol (15.0 g.), acetic acid (160 ml.) and acetic anhydride (83 ml.) is refluxed for nine hours. The mixture then is diluted with ice water (1.5 liter) and extracted with ether. The ether extract is washed with water and a saturated sodium chloride solution and dried over magnesium sulfate. The ether is evaporated and the residue distilled to obtain 16 g. of 2-bromobutyl acetate, B.P. 85–95° C. at 30–40 mm.

STEP B: METHYL [3-CHLORO-4-(1-ACETOXYMETHYLPROPYLMERCAPTO)PHENOXY]ACETATE 2-bromobutyl acetate (7.7 g., 0.0396 mole) and methyl (3-chloro-4-mercaptophenoxy)acetate (9.2 g., 0.0396 mole) are added to a solution of sodium (0.95 g., 0.0396 mole) in methanol (100 ml.), the mixture refluxed for six hours and the methanol evaporated. The residue is taken up in ether and the ether solution washed with water, dried over magnesium sulfate and evaporated. The residue from several preparations then is combined and distilled to obtain methyl [3-chloro-4-(1-acetoxymethylpropylmercapto)phenoxy]acetate, B.P. 185–188° C. at 0.1 mm.

STEP C: [3-CHLORO-4-(1-HYDROXYMETHYLPROPYLMERCAPTO)PHENOXY]ACETIC ACID

Methyl [3-chloro-4-(1-acetoxymethylpropylmercapto)phenoxy]acetate (13.0 g.) is added to a solution of potassium hydroxide (6.0 g.) in methanol (100 ml.) and the mixture refluxed for four hours. The methanol is evaporated, the residue dissolved in water and the solution is acidified. The yellow oil that separates is extracted with ether and the ether extract washed with water, then with saturated sodium chloride and then dried over magnesium sulfate. The ether is evaporated to obtain crude [3-chloro-4 - (1 - hydroxymethylpropylmercapto)phenoxy] acetic acid.

STEP D: METHYL [3-CHLORO-4-(1-HYDROXYMETHYLPROPYLMERCAPTO)PHENOXY]ACETATE

The [3-chloro - 4 - (1-hydroxymethylpropylmercapto)-phenoxy]acetic acid prepared in Step C, is dissolved in a cold mixture of methanol (215 ml.) and sulfuric acid (3.0 ml.) and the solution kept at a temperature above 0° C. for two days. The methanol then is evaporated at reduced pressure, the residue taken up in ether, the ether solution is washed with water, sodium bicarbonate and saturated sodium chloride solution and then dried over magnesium sulfate and evaporated. There is thus obtained 11.5 g. of methyl [3-chloro-4-(1-hydroxymethylpropylmercapto)phenoxy]acetate.

STEP E: METHYL [3-CHLORO-4-(1-CHLOROMETHYLPROPYLMERCAPTO)PHENOXY]ACETATE

Methyl [3-chloro-4-(1-hydroxymethylpropylmercapto)-phenoxy]acetate (11.5 g.) is dissolved in benzene (100 ml.) and thionyl chloride (11.5 g.) is added. After refluxing for 2.5 hours the benzene is removed under reduced pressure to yield 12.0 g. of crude methyl [3-chloro-4-(1-chloromethylpropylmercapto)phenoxy]acetate.

STEP F: [3-CHLORO-4-(1-METHYLENEPROPYLSULFONYL)PHENOXY]ACETIC ACID

Methyl [3 - chloro-4-(1-chloromethylpropylmercapto)-phenoxy]acetate (12.0 g.) is dissolved in acetic acid (80 ml.) and 30% hydrogen peroxide (30 ml.) is added. The mixture is kept at 20–25° C. for 16 hours and then heated at 80–90° C. for seven hours. Then an additional 30 ml. of peroxide is added and heating is continued for an additional 16 hours. The solvent is evaporated at reduced pressure and the residue dissolved in a dilute 5% solution of sodium hydroxide. The resulting solution is filtered and acidified with hydrochloric acid. The oily precipitate thus obtained solidifies slowly and is crystallized from butyl chloride to obtain a product having a melting point of 91–100° C. Vapor phase chromatography shows the product to be 60% of [3-chloro-4-(1-methylenepropylsulfonyl)phenoxy]acetic acid and 40% of [3-chloro-4-(1-butenylsulfonyl)phenoxy]acetic acid, which is the product of Example 11.

Analysis for $C_{12}H_{13}ClO_5S$: Calculated: C, 47.31; H, 4.30; Cl, 11.65. Found: C, 46.92; H, 4.29; Cl, 11.40.

The diuretic and saluretic activity of the instant products makes them useful in treatment of conditions usually associated with edema. Edematous conditions which may be treated by the products of the invention include, for example, hypertension, congestive heart failure, kidney malfunctioning, cirrhosis of the liver and other diseases associated with electrolyte and fluid retention.

The products of the invention can be administered in therapeutic dosages in conventional vehicles as, for example, by oral administration in the form of a tablet as well as by intravenous injection. Also, the dosage of the product may be varied over a wide range as, for example, in the form of scored tablets containing 25, 50, 100, 150, 250 and 500 milligrams of the active ingredients for the symptomatic adjustment of the dosage to the patient to be treated. These dosages are well below the toxic or lethal dose of the products.

A suitable unit dosage form of the products of this invention can be prepared by mixing 50 mg. of a [(1-alkenylsulfonyl)phenoxy]alkanoic acid or a suitable acid addition salt, ester or amide derivative thereof, with 150 mg. of lactose and placing the 200 mg. mixture into a No. 3 gelatin capsule. Similarly, by employing more of the active ingredient and less lactose other dosage forms can be put up in No. 3 gelatin capsules and, should it be necessary to mix more than 200 mg. of ingredients together, larger capsules may be employed. Compressed tablets, pills or other desired unit dosages can be prepared to incorporate the compounds of this invention by conventional methods and, if desired, can be made up as elixirs or as injectable solutions by methods well-known to pharmacists.

It is also within the scope of this invention to combine two or more of the compounds of this invention in a unit dosage form or to combine one or more of the compounds with other known diuretics or with other desired therapeutic or nutritive agents in dosage unit form.

The following example is included to illustrate the preparation of a representative dosage form:

EXAMPLE 14

*Dry-filled capsules containing 500 mg. of active ingredient per capsule*

| | Per capsule, mg. |
|---|---|
| (3-chloro-4-vinylsulfonylphenoxy)acetic acid | 500 |
| Lactose | 144 |
| Magnesium stearate | 6 |
| Capsule size No. 00 | 650 |

The (3-chloro-4-vinylsulfonylphenoxy)acetic acid is reduced to a No. 60 powder, lactose and the magnesium stearate then are passed through a No. 60 bolting cloth onto the powder and the combined ingredients are admixed for 10 minutes and then filled into No. 00 dry gelatin capsules.

Similar dry-filled capsules can be prepared by replacing the active ingredient of the above example by any of the other novel compounds of this invention.

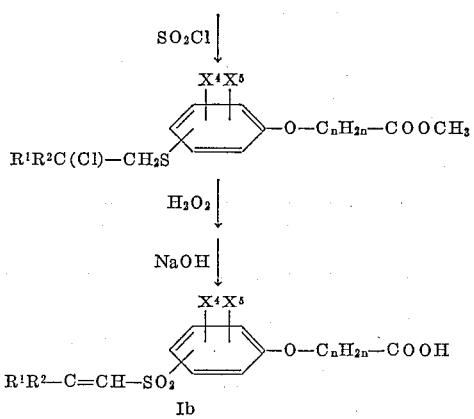

*Table I*

| Ex. | R¹ | R² | X⁴ | X⁵ | —$C_nH_{2n}$— | Position |
|---|---|---|---|---|---|---|
| 15 | —$C_2H_5$ | H | H | 3—$CH_3$ | —$CH_2$—$CH_2$— | 4 |
| 16 | H | H | H | 3Cl | —$CH_2$— | 5 |
| 17 | —$CH_3$ | —$CH_3$ | 2—$CH_3$ | 3—$CH_3$ | —$CH_2$— | 4 |
| 18 | $CH_3$ | H | 2,3-CH=CH—CH=CH— | | —$CH_2$— | 4 |
| 19 | H | H | H | 3—$CH_3$ | —$CH_2$—$CH_2$— | 5 |
| 20 | —$C_2H_5$ | H | 2—$OCH_3$ | H | —CH[CH($CH_3$)$_2$]— | 5 |
| 21 | —$CH_3$ | —$CH_3$ | 2—Cl | 3—Cl | —CH($C_2H_5$)$CH_2$— | 4 |

By substituting the appropriate nitrophenol, ethyl bromoalkanoate and bromohydrin for the 3-chloro-4-nitrophenol, ethyl bromoacetate and 2-bromoethanol of Example 1 and following substantially the procedure described in Steps A–G of that example, the corresponding [(1-alkenylsulfonyl)phenoxy]alkanoic acid products of the invention may be prepared. The following equations and accompanying Table I depict the process of Example 1, Steps A–G, and illustrate the starting materials, intermediates and final products produced thereby. The numerals in the last column of Table I denote the position of the 1-alkenylsulfonyl group on the nucleus of the [(1-alkenylsulfonyl)phenoxy]alkanoic acid described below as product Ib:

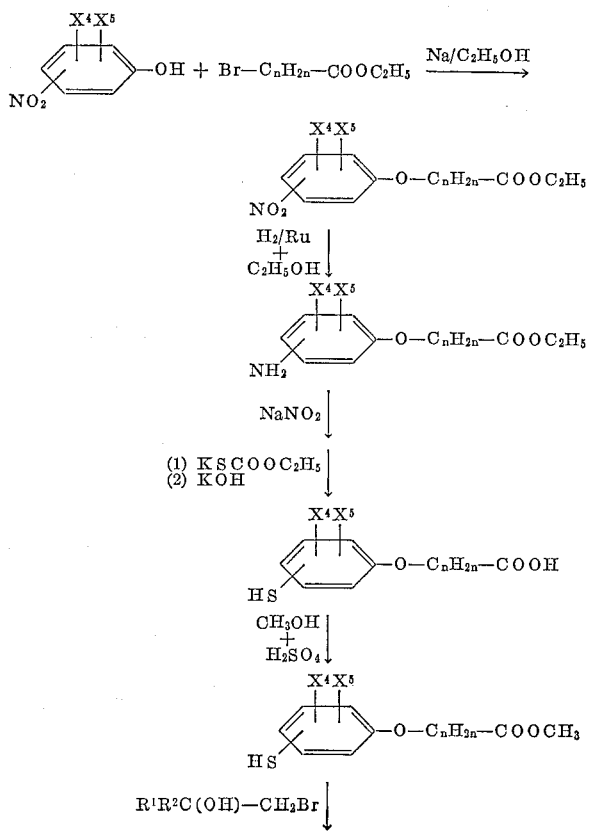

It will be apparent from the foregoing description that the [(1-alkenylsulfonyl)phenoxy]alkanoic acid products of the invention constitute a valuable class of compounds which have not been prepared heretofore. One skilled in the art will also appreciate that the products disclosed in the above examples are merely illustrative and are capable of wide variation and modification without departing from the spirit of this invention.

What is claimed is:

1. A member selected from the group consisting of a compound of the formula:

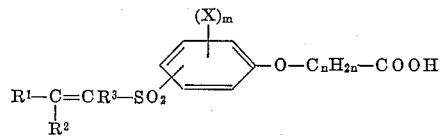

wherein R¹, R² and R³ are similar and dissimilar substituents selected from the group consisting of hydrogen and alkyl; the X radicals represent similar and dissimilar substituents selected from the group consisting of hydrogen, halogen, alkyl, alkoxy and, when substituted on adjacent carbon atoms of the benzene nucleus, two X radicals may be combined to form a hydrocarbylene chain containing four carbon atoms between its points of attachment; $m$ is an integer having a value of 1–4 and $n$ is an integer having a value of 1–4; and the nontoxic, pharmacologically acceptable acid salts, the lower alkyl ester, and the amide, monoalkylamide, dialkylamide and piperidide derivatives thereof.

2. A compound of the formula:

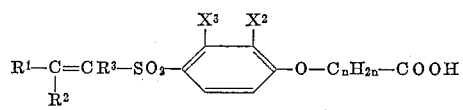

wherein R¹, R² and R³ are similar and dissimilar substituents selected from the group consisting of hydrogen and alkyl; X² and X³ represent similar and dissimilar members selected from the group consisting of hydrogen, halogen and lower alkyl and $n$ is an integer having a value of 1–4.

3. A [4 - (1 - alkenylsulfonyl)phenoxy]alkanoic acid wherein the alkanoic acid moiety has from 1–5 carbon atoms.

4. A [4 - (1 - alkenylsulfonyl)phenoxy]alkanoic acid wherein the alkanoic acid moiety has from 1–5 carbon atoms and the phenoxy nucleus is substituted in the 3-position by halogen.

5. A [4 - (1 - alkenylsulfonyl)phenoxy]alkanoic acid wherein the alkanoic acid moiety has from 1–5 carbon atoms and the phenoxy nucleus is substituted in the 3-position by alkyl.

6. A [4 - (1 - alkenylsulfonyl)phenoxy]alkanoic acid wherein the alkanoic acid moiety has from 1–5 carbon atoms and the phenoxy nucleus is substituted in the 2- and 3-positions by halogen.

7. A [4 - (1 - alkenylsulfonyl)phenoxy]alkanoic acid wherein the alkanoic acid moiety has from 1–5 carbon atoms and the phenoxy nucleus is substituted in the 2- and 3-positions by alkyl.

8. A compound of the formula:

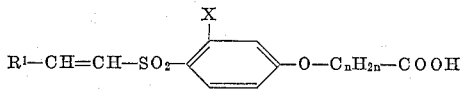

wherein $R^1$ is alkyl; X is halogen and $n$ is an integer having a value of 1–4.

9. A compound of the formula:

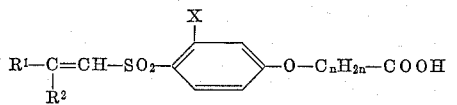

wherein $R^1$ and $R^2$ are similar and dissimilar lower alkyl radicals; X is halogen and $n$ is an integer having a value of 1–4.

10. A compound of the formula:

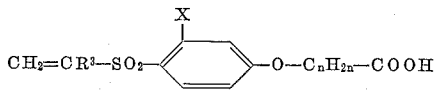

wherein $R^3$ is alkyl; X is halogen and $n$ is an integer having a value of 1–4.

11. (3-chloro-4-vinylsulfonylphenoxy)acetic acid.
12. (4-vinylsulfonylphenoxy)acetic acid.
13. (3-methyl-4-vinylsulfonylphenoxy)acetic acid.
14. (2,3-dimethyl-4-vinylsulfonylphenoxy)acetic acid.
15. (3-chloro-4-propenylsulfonylphenoxy)acetic acid.
16. [3 - chloro - 4 - (1 - butenylsulfonyl)phenoxy]acetic acid.
17. [3 - chloro - 4 - (2 - methylpropenylsulfonyl)phenoxy]acetic acid.
18. [3 - chloro - 4 - (1 - methylenepropylsulfonyl)phenoxy]acetic acid.

References Cited by the Examiner

UNITED STATES PATENTS

| | | | |
|---|---|---|---|
| 2,163,180 | 6/1939 | Ufer | 260—607 |
| 2,470,077 | 5/1949 | Fincke | 260—607 |
| 2,543,648 | 2/1951 | Strosacker et al. | 260—654 |
| 3,028,439 | 4/1962 | Theiling et al. | 260—654 |

OTHER REFERENCES

Karrer: "Organic Chemistry," (1950, pp. 75, 215, 216).

LORRAINE A. WEINBERGER, *Primary Examiner.*

S. B. WILLIAMS, *Assistant Examiner.*